3,251,901
PREPARATION OF NORMALLY LIQUID HIGHER MOLECULAR WEIGHT OLEFINS
Robert Bacskai, Sausalito, Calif., assignor to Chevron Research Company, a corporation of Delaware
No Drawing. Filed June 29, 1961, Ser. No. 120,477
2 Claims. (Cl. 260—683.15)

This invention relates to an improved process for the polymerization of α-olefins to form higher molecular weight olefins useful as intermediates in the production of detergents, lubricant additives, plasticizers and the like.

It is known to prepare higher molecular weight olefins by the polymerization of α-olefins in the presence of catalysts prepared by the interaction of a reducible transition metal compound with an organometallic compound of the first three groups of the Periodic Chart of the Atoms (H. D. Hubbard, revised 1956 by W. F. Meggers of the National Bureau of Standards), but these processes require the use of some means to disengage the growing or grown polymer chain from the catalyst site as the olefin entity. Thus, nickel chloride has been used as such a catalyst means, but it is found to be impracticable because the catalyst mixture, polymerization catalyst plus the nickel chloride, is practicably inseparable and not subject to reuse. A preferred method known in the art employs two reaction stages; the first, a conventional α-olefin polymerization; the second, a thermal dissociation in the presence of monomer at relatively high temperatures, but one susceptible to violently explosive dissociations unless carefully controlled. The present α-olefin polymerization process results in the production of higher molecular weight olefins in an easily controlled polymerization process.

It has now been found that higher molecular weight olefins may be produced in an α-olefin polymerization process using a polymerization catalyst prepared by the interaction of a transition metal compound with an organometallic reducing compound in which the polymerization is carried out in the presence of a small amount of a low molecular weight allyl halide. Surprisingly, it appears that the low molecular weight allyl halides act in effect as moderators of the catalyst causing the growing polymer chain to leave the catalyst substrate under mild reaction conditions. It also appears that the allyl halide may participate in the polymerization in effect adding to the growing polymer chain by dissociation of its carbon-halogen bond followed by a 1,2-addition to the grown chain. In either event, higher molecular weight olefin leaves the catalyst under polymerization conditions, and the result is the production of higher molecular weight olefins from monomer in a single stage reaction. By varying the relative amounts of the allyl halide with respect to the monomer and to the catalyst, the molecular weight of the product may be varied.

In general, the amount of allyl halide to be used will vary from very small amounts where a higher molecular weight olefin product is desired to appreciably larger amounts from which use a relatively lower molecular olefin product is obtained. Where no allyl halide is added, of course, the resulting polymer is the polymer conventionally obtained as taught in the art. As little as about $10^{-4}$ mols of allyl halide per mol of monomer may be employed, and as much used as about $10^{-1}$ mols of the halide per mol of the monomer. A particularly desirable mol ratio is in the $10^{-3}$ to $10^{-1}$ range which results in the production of higher molecular weight olefins corresponding to a degree of polymerization in the range from about five to one thousand.

The production of higher molecular weight olefins by the use of allyl halides may also be accomplished in a two-stage reaction by mixing α-olefin monomer and catalyst in particular ratios to give the desired molecular weight range. In this manner, there is produced a polymerizate consisting of the catalyst substrate and the grown but associated polymer as in the prior art process. Subsequently, the dissociation of the desired higher molecular weight olefin from the catalyst substrate is accomplished by contacting the polymerizate with a dilute solution of a low molecular weight allyl halide in an inert medium. Whether or not the allyl halide is added concurrently or subsequently, the process lends itself to continuous operation by the use of a means of separating the catalyst from the product mixture, as for example, by centrifugation. The preferred method of operation is polymerization of the monomer in the presence of the allyl halide.

Contact of the catalyst with the allyl halide in the absence of monomer is to be avoided because under these conditions, rapid deactivation of the catalyst occurs.

The allyl halides contemplated for use in the process of the present invention are low molecular weight allyl halides containing from about 3 to 13 carbon atoms per molecule. They are represented by the general formula:

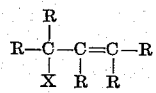

where the substituent R groups may be hydrogen or one or more hydrocarbon radicals such as phenyl, cycloalkyl, methyl, ethyl, and higher alkyl groups so long as the total number of carbon atoms per molecule does not exceed about 13. Higher molecular weight allyl halides are undesirable because of their tendency to exhibit inhibitory steric effects. The X of the general formula may be fluorine, chlorine, and bromine, i.e., halogens having an atomic number below 36.

Representative allyl halides are allyl, α-methallyl, β-methallyl, γ-methallyl, α,α-dimethallyl, α,γ-dimethallyl, β,γ-dimethallyl, α,β-dimethallyl, the corresponding ethyl substituted allyls, α-phenylallyl, γ-phenylallyl, β-phenylallyl, α and γ-cyclohexylallyl and the like. The preferred halides useful in the process of the present invention are low molecular weight allylic chlorides although the corresponding fluorides and bromides are also useful in the process. The preference is predicated mainly upon the basis of the ready availability of the allylic chlorides and their lower cost.

A wide variety of α-olefin hydrocarbons are useful monomers in the practice of the present invention. The process is applicable to the polymerization of olefins of the general formula:

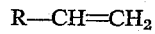

wherein R is hydrogen, lower alkyl, cycloalkyl, or aryl. Examples of such olefins are ethylene, propylene, butene-1, 4-methylpentene-1, vinylcyclohexane, styrene, octene-1, hexadecene-1, octadecene-1, and higher molecular weight α-olefins as well as mixtures of α-olefins. In general, as the molecular weight of the α-olefin monomer is increased, the rate of polymerization decreases such that as a practical matter α-olefin monomers in the molecular weight range above about that of a 20-carbon atom α-olefin are more or less impracticable.

The polymerization catalysts useful in the practice of the present invention are broadly those α-olefin polymerization catalysts prepared by the interaction of a reducible transition metal compound with an organometallic compound of the first three groups of the Periodic Table. More particularly, the catalyst useful in the practice of the present invention are those α-olefin polymerization catalysts prepared by the interaction of a reducible compound of titanium, zirconium, and hafnium with an organo-metallic compound of the first three groups of the Periodic Chart of Atoms and their hydride equivalents. Representative transition compounds are the chlorides, bromides, fluorides, iodides, and lower molecular weight alkoxides of the transition metals and combinations thereof. By lower molecular weight alkoxides is meant alkoxides having alkyl rests of 20 carbon atoms and less.

Representative organometallic compounds of the first three groups of the Periodic Chart include the lower molecular weight organometallo alkyls of these elements as well as their sesquihalides and the like. Similarly, the metal hydrides and the mixed alkyl metallo hydrides are also useful. By lower molecular weight alkyls is meant alkyls having no more than about 20 carbon atoms per group. The alkyl group present in the catalyst need not be the group corresponding to the α-olefin monomer being used, but this is frequently very desirable. Particularly useful α-olefin polymerization catalysts are those prepared from the interaction of lower molecular weight aluminum alkyls with titanium tetrachloride. Representative aluminum alkyls are triethyl aluminum, triisobutyl aluminum, tri-n-hexyl aluminum and the like.

In the preparation of the catalyst by the interaction of the transition metal compuond with the organometallic compound, a rather wide range of relative amounts may be used. However, in the terms of formula weight ratios of the transition metal compound to the organometallic compound, ratios of from 1:10 and 10:1 are operable. The preferred ratios are in the range of from 1:1 to 1:2.

In the preparation of the catalyst and in the operation of the process proper, it is generally desirable to employ inert liquids as media. Suitable inert liquids include hydrocarbons such as the hexanes, heptanes, octanes, decanes, cyclohexanes and the like, as well as inert aromatic hydrocarbons such as benzene, toluene, xylene, and inertly substituted derivatives thereof.

In a typical embodiment of the present invention a titanium compound, preferably titanium tetrachloride, is brought into contact with an organometallic compound, preferably a lower molecular weight alkyl aluminum compound, in the presence of an inert diluent in a confined reaction zone under an inert atmosphere. The temperature of contacting may vary widely, but typically it will be from about 0° C. to about 150° C. and even higher. Pursuant to the contacting, a finely divided α-olefin polymerization catalyst is formed. Thereafter, the α-olefin monomer containing a small amount of an allyl halide is contacted with the α-olefin polymerization catalyst under polymerization conditions. It is necessary that the allyl halide be thoroughly mixed with the α-olefin monomer before contacting with the catalyst, and this in general implies the premixing of these components before their admission into the reaction zone, but this does not preclude a separate admission of the individual components into the reaction zone followed by mixing which precedes contact with the catalyst.

The quantity of catalyst to be used in terms of the weight of the monomer charged may vary within wide limits, but in general from about 0.1 to about 2 percent by weight of the monomer charged is the amount of catalyst to be used. If the catalyst is very finely divided, and also if there is little or no catalyst poison present in the reaction zone, as little as one percent or less of the catalyst is necessary. Although some separation and recycle of the active catalyst from product is possible by such means as centrifugation, a preferred embodiment of the present process is the batch process.

Polymerization temperature suitable for the present process ranges from about −50° C. to about 150° C. The optimum varies depending upon the particular catalyst system, the prior history of the catalyst, and the particular monomer being employed. In general, the reaction is conveniently carried out at ambient temperatures. A temperature in excess of about 150° C. should be avoided because of tendencies of the catalyst systems to degrade, and more particularly because of the tendencies of the catalyst systems to degrade in the presence of the very reactive allyl halides under conditions of elevated temperature.

Except for the very low molecular weight monomers, i.e., ethene and propene, the pressures employed in the polymerization will be substantially atmospheric pressure. In the polymerization of these low molecular weight monomers, pressures as high as 100 atmospheres or higher may be employed, and some adjustments with respect to temperature and pressure may be necessary in order to introduce the catalyst to a monomer-allyl halide mixture in the proper proportions, i.e., it may be desirable to introduce the allyl halide and the low molecular weight monomer as an intimate gaseous mixture to the reaction zone. It may also be desirable to introduce the mixture of the olefin monomer and the allylic halide in an inert diluent.

After a contact period of from about one-half hour to about 5 hours or even longer, depending upon the particular catalyst and α-olefin monomer employed, the product mixture is disengaged from the catalyst by filtration, centrifugation and the like as in a continuous process; or as in a batch process, the catalyst is destroyed by the addition of a catalyst poison such as water or aqueous methanolic solution of hydrochloric acid, and thereafter the product is recovered by conventional means.

By way of illustration the following examples were conducted:

Example I

A 3-liter autoclave was thoroughly dried and charged with 390 ml. of anhydrous n-heptane. After converting the atmosphere in the autoclave to an oxygen free nitrogen atmosphere, and while stirring the contents of the autoclave, 2.67 grams ($1.41 \times 10^{-2}$ mols) of titanium tetrachloride and 3.36 grams ($1.69 \times 10^{-2}$ mols) of triisobutyl aluminum were added. Stirring was continued and the catalyst suspension thus prepared was then heated to about 70° C. and a solution of 2.82 grams ($3.69 \times 10^{-2}$ mols) of allyl chloride in 150 grams of liquefied butene-1 was introduced into contact with the catalyst in the autoclave. The addition required 30 minutes to complete. Stirring at temperature was continued for an additional 120 minutes after which the reactor and contents were cooled to ambient temperature. 20 ml. of methanol were then added to the reaction mixture to decompose the catalyst. The product obtained after removal of the solvent consisted of 108 grams of liquid polymer. This corresponded to a 72 percent of theory yield based upon monomer, and was found to have the following characteristics.

Nature of the polymer (room temperature) ____ Liquid
Molecular weight (cryoscopic) _____ 486
Weight percent chlorine _____ 0.17
Bromine number _____ 33
Average number of double bonds per molecule __ 1

Example II

The previous example was reepated except that no allyl halide was added. A polymer product was obtained in a 59.4 percent of theory yield and had the following characteristics:

Nature of the polymer (room temperature) _____ Solid

Example III

A run analogous to Example I was made except that the allyl chloride was added to the catalyst suspension in the absence of monomer. Subsequent addition of the monomer did not yield any appreciable amount of polymer.

Example IV

As in Example I a catalyst suspension was prepared in 100 ml. of anhydrous n-heptane from 2.74 grams ($1.44 \times 10^{-2}$ mols)

of titanium tetrachloride and 4.72 grams (2.38×10⁻² mols) of triisobutyl aluminum. While maintaining the temperature of the autoclave at 70° C. and while stirring, a mixture of 0.5 ml. allylchloride (0.61×10⁻² mols) in 50 ml. (0.319 mol) of octene-1 was introduced dropwise into the autoclave. The total addition time was 20 minutes. After two hours at reaction temperature following the completion of the addition, the reaction mixture was cooled and water added to destroy the catalyst. The product was worked up in a conventional manner and found to consist of 31.5 grams of poly-1-octene in the form of viscous olefinic oil. Measured in benzene at 30° C., the polymer was found to have an intrinsic viscosity of 0.26.

*Example V*

Example IV was repeated except that the amount of allyl chloride used was 1.0 ml. A 90.8 percent of theory yield of poly-1-octene was obtained. The intrinsic viscosity ($\eta$) was 0.20.

*Example VI*

Example IV was repeated as a control experiment except that no allyl chloride was added. The product was a tacky semisolid material having an intrinsic viscosity of 0.598.

*Example VII*

Example I was repeated except that 4-methyl-1-pentene was employed as the 1-alkene monomer. In the absence of added allyl halide the product was a solid. In the presence of allyl chloride the product obtained was liquid.

Very small amounts of added allyl chloride cause a complete change in the product polymer from the solid normally obtained where no allyl halide is added to an olefinic oil of greatly reduced viscosity where only a very small amount is used. The data in the following table are illustrative.

TABLE I.—THE EFFECT OF ADDING ALLYL CHLORIDE IN THE POLYMERIZATION AlR₃-TiCl₄ POLYMERIZATION OF OCTENE-1

| Percent Allyl Chloride in Monomer | Polymer, Percent Yield | Polymer Room Temp. | Intrinsic Viscosity ($\eta$) |
|---|---|---|---|
| 0 | 83.5 | Solid | 0.60 |
| 1.3 | 88.0 | Liquid | 0.26 |
| 2.6 | 90.8 | Liquid | 0.20 |

These reduced viscosity olefinic polymers are useful as lubricants and especially useful as intermediates for the production of lubricant additives because of the olefin functionality. Among the many uses for this material is the production of detergent additives by the free radical catalyzed addition of bisulfite and biphosphite. There are many other uses.

*Example VIII*

Additional examples were run in the manner of Example I but with the change that carbon tetrachloride or n-propylchloride was substituted in identical amounts for the allyl chloride. In each case the product polymer was a solid and no liquid polymer was produced.

I claim:
1. A process for the production of normally liquid olefin polymers having a degree of polymerization in the range from about 5 to 1000, which comprises contacting a mixture of a polymerizable α-olefin having the formula:

$$R-CH=CH_2$$

in which R is a radical selected from the group consisting of hydrogen and alkyls having less than 21 carbon atoms, and an allyl halide containing 3 to 13 carbon atoms of the general formula:

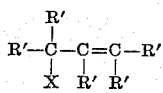

in which the several R's are selected from the group consisting of hydrogen, phenyl, cycloalkyl, methyl, ethyl, propyl, and butyl, and in which X is a halide having an atomic number below 36, the ratio of olefin to allyl halide in the mixture being in the range 10:1 to 10,000:1, with a catalyst formed by the interaction of titanium tetrachloride with a tri-lower alkyl aluminum at a temperature in the range −50° to 150° C. and at a pressure in the range 1 to 100 atmospheres.

2. The process of claim 1 wherein said α-olefin is selected from the group consisting of butene, octene-1, and 4-methyl-1-pentene.

References Cited by the Examiner

UNITED STATES PATENTS

| 2,827,447 | 3/1958 | Nowlin et al. | 260—94.9 |
| 2,832,759 | 4/1958 | Nowlin et al. | 260—94.9 |
| 2,908,674 | 10/1959 | Nowlin et al. | 260—94.9 |
| 2,910,461 | 10/1959 | Nowlin et al. | 260—94.9 |
| 2,944,048 | 7/1960 | Nowlin et al. | 260—94.9 |
| 2,956,993 | 10/1960 | Nowlin et al. | 260—94.9 |
| 2,993,883 | 7/1961 | Lyons | 260—94.9 |
| 3,101,327 | 8/1963 | Lyons | 260—94.9 |

FOREIGN PATENTS

| 815,429 | 6/1959 | Great Britain. |
| 838,996 | 6/1960 | Great Britain. |

JOSEPH L. SCHOFER, *Primary Examiner.*

P. E. MANGAN, JOSEPH R. LIBERMAN, WILLIAM H. SHORT, *Examiners.*